US010917870B2

(12) United States Patent
Pan et al.

(10) Patent No.: US 10,917,870 B2
(45) Date of Patent: Feb. 9, 2021

(54) ANGLE OF ARRIVAL ESTIMATION METHOD AND DEVICE

(71) Applicant: Huawei Technologies Co., Ltd., Shenzhen (CN)

(72) Inventors: Chun Pan, Nanjing (CN); Zhijian He, Nanjing (CN); Yongqian Xu, Nanjing (CN); Yungui Wang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/547,290

(22) Filed: Aug. 21, 2019

(65) Prior Publication Data

US 2020/0068523 A1 Feb. 27, 2020

(30) Foreign Application Priority Data

Aug. 23, 2018 (CN) .......................... 2018 1 0967452

(51) Int. Cl.
*H04W 64/00* (2009.01)
*H04W 72/12* (2009.01)
*G01S 3/50* (2006.01)

(52) U.S. Cl.
CPC ............. *H04W 64/006* (2013.01); *G01S 3/50* (2013.01); *H04W 72/1226* (2013.01)

(58) Field of Classification Search
CPC ... H04W 64/006; H04W 72/1226; G01S 3/50; G01S 3/48; G01S 11/02; G01S 5/28; G01S 3/12; G01S 3/10; G01S 3/023; G01S 3/46; G01S 5/021; G01S 5/04; H04B 7/0874; H04B 7/0626; H04B 17/21; H04B 7/086

USPC ..................................................... 455/452.1
See application file for complete search history.

(56) References Cited

U.S. PATENT DOCUMENTS

| 5,936,575 A * | 8/1999 | Azzarelli ................. G01S 3/06 342/362 |
| 9,445,237 B1 | 9/2016 | Nallampatti Ekambaram et al. |
| 10,476,539 B1 * | 11/2019 | Berger ................. H04B 7/0885 |
| 2013/0088395 A1 | 4/2013 | Vaarakangas |
| 2014/0327579 A1 | 11/2014 | Hart et al. |

(Continued)

OTHER PUBLICATIONS

Foreign Communication From a Counterpart Application, European Application No. 19193257.3, Extended European Search Report dated Dec. 3, 2019, 13 pages.

(Continued)

*Primary Examiner* — Anthony S Addy
*Assistant Examiner* — Farid Seyedvosoghi
(74) *Attorney, Agent, or Firm* — Conley Rose, P.C.

(57) ABSTRACT

An angle of arrival estimation method and device, where a first device: collects a first signal from a second device using a reference antenna and a first antenna group; determines first channel state information (CSI); collects a second signal from the second device using the reference antenna and a second antenna group; determines second CSI; determines a phase difference vector between the first signal and the second signal based on a vector corresponding to the reference antenna in the first CSI and a vector corresponding to the reference antenna in the second CSI; compensates for the second CSI using the phase difference vector; and estimates an angle of arrival of the second device based on the first CSI and compensated second CSI.

20 Claims, 8 Drawing Sheets

(56) References Cited

U.S. PATENT DOCUMENTS

2016/0187451 A1\* 6/2016 Meiman ............... G01S 3/48
                                                      342/442
2019/0213368 A1\* 7/2019 White ............... G06K 7/10445

OTHER PUBLICATIONS

"IEEE P802.11 Wireless LANs, TGn Channel Models," IEEE 802.11-03/940r4, May 10, 2004, 45 pages.

"Part 11: Wireless LAN Medium Access Control (MAC) and Physical Layer (PHY) Specifications," IEEE Std 802.11™-2016, IEEE Computer Society, Part 1, Dec. 7, 2016, 1767 pages.

"Part 11: Wireless LAN Medium Access Control (MAC) and Physical Layer (PHY) Specifications," IEEE Std 802.11™-2016, IEEE Computer Society, Part 2, Dec. 7, 2016, 1767 pages.

Czink, N., et al., "Number of Multipath Clusters in Indoor MIMO Propagation Environments," 2004, 11 pages.

Farid, Z., et al.,"Recent Advances in Wireless Indoor Localization Techniques and System," Hindawi Publishing Corporation, Journal of Computer Networks and Communications, vol. 2013, Article ID 185138, May 17, 2013, 12 pages.

Kotaru, M., "SpotFi: Decimeter Level Localization Using WiFi," Aug. 17-21, 2015, pp. 269-282.

\* cited by examiner

| category Category | public action Public action | dialog token Dialog token | follow up dialog token Follow up dialog token | TOD Sending time | TOA Receiving time |
|---|---|---|---|---|---|

| TOD error Sending time error | TOA error Receiving time error | LCI report LCI report (Optional) | location civic report Location report (Optional) | Fine timing measurement parameters Fine timing measurement parameters (Optional) |
|---|---|---|---|---|

FIG. 10

ANGLE OF ARRIVAL ESTIMATION METHOD AND DEVICE

CROSS-REFERENCE TO RELATED APPLICATION

This application claims priority to Chinese Patent Application No. 201810967452.5, filed on Aug. 23, 2018, which is hereby incorporated by reference in its entirety.

TECHNICAL FIELD

This application relates to the wireless communications field, and in particular, to an angle of arrival estimation method and device.

BACKGROUND

An access point (access point, AP) in a wireless local area network (WLAN) may estimate, by using an antenna array technology, an angle of arrival (AoA) at which a radio signal of a terminal device arrives at the AP. The AoA may be used to locate the terminal device.

The AP collects, using a radio frequency circuit, a radio signal received by an antenna. Generally, one radio frequency circuit can obtain, at a same moment, only a radio signal collected by one antenna. A hardware circuit of one AP includes a limited quantity of radio frequency circuits, for example, there are usually three or four radio frequency circuits. However, an increase of a quantity of antennas in an antenna array helps improve estimation accuracy of an angle of arrival of a terminal. If the quantity of radio frequency circuits is increased to improve the estimation accuracy of the angle of arrival of the terminal, design complexity, costs, and the like of a hardware circuit are increased.

SUMMARY

This application provides an angle of arrival estimation method and device, to ensure estimation accuracy of an angle of arrival using a plurality of antennas without increasing a quantity of radio frequency circuits.

According to a first aspect, this application provides an angle of arrival estimation method, including: collecting, by a first device in a first time interval, a first signal from a second device using a reference antenna of the first device and each antenna in a first antenna group, where the first antenna group includes N antennas, and N is an integer greater than or equal to 1; collecting, in a second time interval, a second signal from the second device using the reference antenna and each antenna in a second antenna group of the first device, where the second antenna group includes M antennas, and M is an integer greater than or equal to 1; estimating, by the first device, first channel state information (CSI), where the first CSI is CSI of the first signal, the first CSI includes N+1 vectors, and the N+1 vectors respectively correspond to the N antennas and the reference antenna; estimating, by the first device, second CSI, where the second CSI is of the second signal, the second CSI includes M+1 vectors, and the M+1 vectors respectively correspond to the M antennas and the reference antenna; determining, by the first device, a phase difference vector between the first signal and the second signal based on a vector corresponding to the reference antenna in the first CSI and a vector corresponding to the reference antenna in the second CSI; and compensating for, by the first device, each of the M vectors corresponding to the M antennas in the second CSI using the phase difference vector, and estimating, based on the first CSI and M compensated vectors in the second CSI, an angle of arrival of a signal sent by the second device; or compensating for, by the first device, each of the N vectors corresponding to the N antennas in the first CSI using the phase difference vector, and estimating, based on the second CSI and N compensated vectors in the first CSI, an angle of arrival of a signal sent by the second device.

The foregoing method may be applied to a device in which a quantity of antennas is greater than a quantity of radio frequency circuits, such that the radio frequency circuit collects, in different time periods, signals received by different antennas. According to the foregoing method, the first device determines the phase difference vector between the first signal and the second signal based on the vector corresponding to the reference antenna in the first CSI and the vector corresponding to the reference antenna in the second CSI, and the phase difference is generated due to a sampling time offset of signals sent by the second device and a processing latency difference of a radio frequency front end. The first device compensates for, based on the phase difference vector, a vector other than the vector corresponding to the reference antenna in the second CSI (or the first CSI), which is equivalent to obtaining CSI that is obtained based on signals received by the reference antenna, the first antenna group, and the second antenna group in a same time period, and then estimating, based on the CSI, the angle of arrival of the signal sent by the second device. Because the angle of arrival of the second device is estimated using the signals received by the reference antenna, the first antenna group, and the second antenna group, estimation accuracy of the angle of arrival is improved, and the quantity of radio frequency circuits does not need to be increased.

In a possible implementation, when determining the phase difference vector between the first signal and the second signal that are collected by the reference antenna, the first device may calculate a difference between the vector corresponding to the reference antenna in the first CSI and the vector corresponding to the reference antenna in the second CSI, fit a plurality of elements in the difference based on frequencies corresponding to the plurality of elements in the difference, and determine a phase difference at each frequency location in the phase difference vector.

Because a fitting operation helps reduce noise interference, the estimation accuracy of the angle of arrival is further improved using the foregoing implementation.

In a possible implementation, the first device receives a first message sent by the second device, and sends a second message to the second device, where the second message is a response to the first message. The first device receives a third message sent by the second device, where the first message or the third message includes a time at which the second device sends the first message, and the third message includes a time at which the second device receives the second message. The first device estimates a distance between the first device and the second device based on the time at which the second device sends the first message, a time at which the first device receives the first message, a time at which the first device sends the second message, and the time at which the second device receives the second message, and locates the second device based on the estimated distance and the estimated angle of arrival.

In a conventional angle of arrival—based locating method, usually, angles of arrival of signals sent by a same terminal are sent by a plurality of APs at known locations to a server, and the server locates the terminal. In the foregoing method, the first device may estimate the distance between the first device and the second device based on a transmission time of the first message and a transmission time of the second message, and can then locate the second device with reference to the estimated angle of arrival of the signal sent by the second device, and does not need to locate the second device with reference to angles of arrival estimated by a plurality of devices.

According to a second aspect, this application provides an angle of arrival estimation device, where the device may include a receiving unit and a processing unit, and may further include a sending unit, and is configured to implement the method according to any one of the implementations of the first aspect.

According to a third aspect, this application provides an angle of arrival estimation device, where the device may include a transceiver and a processor, and is configured to implement the method according to any one of the implementations of the first aspect.

According to a fourth aspect, this application provides a computer readable storage medium, and the computer readable storage medium stores a computer instruction. When the instruction runs on a computer, the computer performs the method according to any one of the implementations of the first aspect.

DESCRIPTION OF EMBODIMENTS

To make the objectives, technical solutions, and advantages of this application clearer, the following further describes this application in detail with reference to the accompanying drawings.

With the development of intelligent terminals, more applications can provide personalized and differentiated services for users based on location information of the terminal, such as advertisement push, nearby service discovery, and navigation. Positioning accuracy of the terminal affects user experience of these services.

An AOA-based locating method is a common method for locating a terminal. When the terminal is located using the method, a larger quantity of receive antennas helps improve estimation accuracy of an angle of arrival of the terminal, thereby helping improve positioning accuracy of the terminal. However, if a radio frequency circuit is configured for each antenna, design complexity, costs, and the like of a hardware circuit are increased.

Therefore, the embodiments of this application provide an angle of arrival estimation method, to estimate an angle of arrival using a relatively large quantity of antennas without increasing a quantity of radio frequency circuits.

The angle of arrival estimation method provided in the embodiments of this application may be applied to a wireless local area network (WLAN), or may be applied to a Long Term Evolution (LTE) system, a 5th Generation (5G) mobile communications system, or another wireless communications system.

The method may be used by a first device to estimate an angle of arrival of a signal sent by a second device, to locate the second device. For example, the method may be applied to a scenario in which an AP locates a terminal, a terminal locates an AP, a base station locates a terminal, a terminal locates a base station, a terminal locates a terminal, or the like. The terminal in the embodiments of this application may include various handheld devices, in-vehicle devices, wearable devices, computing devices, or the like that have a wireless function.

It should be understood that words such as "first" and "second" in the embodiments of this application are only used for distinctive description, but cannot be understood as indication or implication of relative importance, and cannot be understood as an indication or implication of a sequence. For example, a first time interval and a second time interval are used to distinguish between different time periods, but do not indicate a sequence of the two time intervals. For another example, a first antenna group and a second antenna group are used to distinguish between two groups of antennas, but do not indicate a difference between importance of the two groups of antennas.

A scenario in which an AP locates a terminal in a WLAN is used as an example below to describe in detail the angle of arrival estimation method provided in the embodiments of this application.

Figure 1:
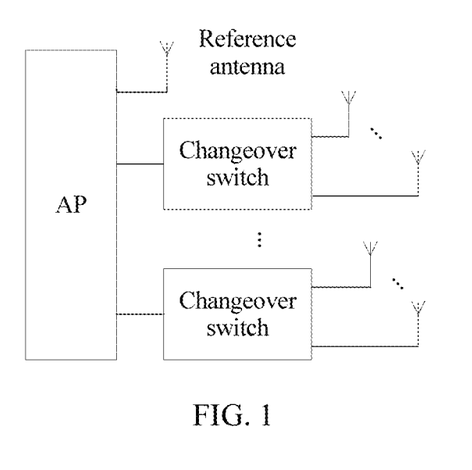
FIG. 1 is a first schematic structural diagram of an AP according to an embodiment of this application.

To meet a positioning accuracy requirement for the terminal, the AP includes a relatively large quantity of antennas, as shown in FIG. 1. For example, the AP may include a reference antenna, a first antenna group, and a second antenna group. The AP may alternatively include more antenna groups. The first antenna group includes N antennas, the second antenna group includes M antennas, and both M and N are integers greater than or equal to 1. A quantity of radio frequency circuits in the AP is less than a total quantity of antennas of the AP, and is greater than or equal to a quantity of antennas in any antenna group plus 1. To be more specific, at a specific moment, only some antennas of the AP are used to collect signals by using the radio frequency circuit.

The first antenna group and the second antenna group each may form an antenna array, or may jointly form an antenna array.

Figure 2:
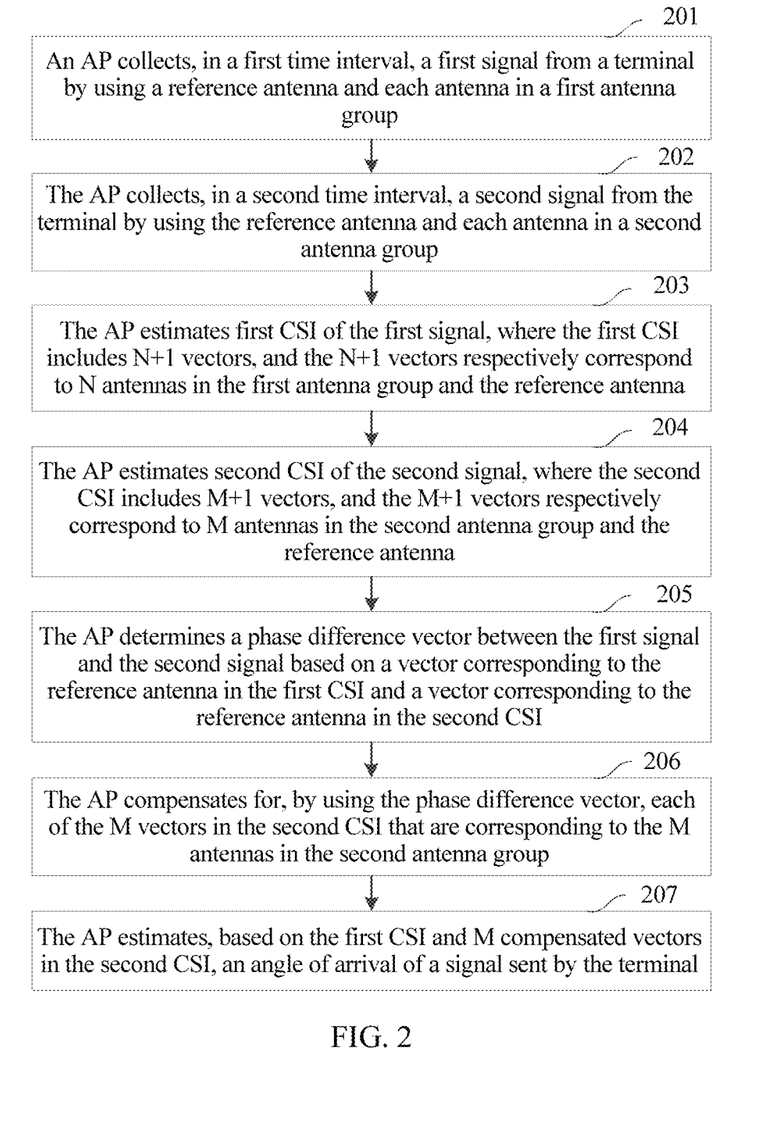
FIG. 2 is a schematic flowchart of an angle of arrival estimation method according to an embodiment of this application.

FIG. 2 is a schematic flowchart of an angle of arrival estimation method according to an embodiment of this application. As shown in the figure, the method may include the following steps.

Step 201: An AP collects, in a first time interval, a first signal from a terminal using a reference antenna and each antenna in a first antenna group.

Step 202: The AP collects, in a second time interval, a second signal from the terminal using the reference antenna and each antenna in a second antenna group.

Signals collected by a relatively large quantity of antennas are obtained using a relatively small quantity of radio frequency circuits in the AP, and therefore the AP cannot collect signals simultaneously using all antennas, and the signals are collected by the reference antenna, the first antenna group, and the second antenna group using a method similar to time division multiplexing.

Signals sent by the terminal to the AP are consecutive in time domain. Information such as phases and amplitudes of the signals that are consecutive in time domain are different at different times. Therefore, a part of the consecutive signals that is transmitted to the AP in the first time interval is referred to as the first signal, and a part of the consecutive signals that is transmitted to the AP in the second time interval is referred to as the second signal.

Step 203: The AP estimates first CSI of the first signal. The first CSI includes N+1 vectors, and the N+1 vectors respectively correspond to N antennas in the first antenna group and the reference antenna.

For example, if the first antenna group includes three antennas, the first CSI may include four vectors that are separately CSI_1(1), CSI_1(2), CSI_1(3), and CSI_1(4), where CSI_1(1), CSI_1(2), and CSI_1(3) respectively correspond to the three antennas in the first antenna group, and CSI_1(4) corresponds to the reference antenna.

Step 204: The AP estimates second CSI of the second signal. The second CSI includes M+1 vectors, and the M+1 vectors respectively correspond to M antennas in the second antenna group and the reference antenna.

For example, if the second antenna group includes four antennas, the second CSI may include five vectors that are separately CSI_2(1), CSI_2(2), CSI_2(3), CSI_2(4), and CSI_2(5), where CSI_2(1), CSI_2(2), CSI_2(3), and CSI_2 (4) respectively correspond to the four antennas in the second antenna group, and CSI_2(5) corresponds to the reference antenna.

The CSI may represent information about a phase and an amplitude of a signal received by each antenna at different frequencies. The AP may further estimate an angle of arrival of the terminal based on the estimated CSI. The CSI includes a vector corresponding to an antenna that collects a signal, each vector includes a plurality of elements, and each element may represent a phase of the received signal at a frequency corresponding to the element. A quantity of elements included in each vector may be different values in different scenarios based on a protocol.

A sequence of step 201 to step 204 is not limited in this embodiment of this application. The AP may estimate the first CSI and the second CSI after obtaining the first signal and the second signal. Alternatively, the AP may estimate the first CSI immediately after obtaining the first signal, and estimate the second CSI immediately after obtaining the second signal, in other words, step 201 and step 203 are combined, and step 202 and step 204 are combined.

Step 205: The AP determines a phase difference vector between the first signal and the second signal based on a vector corresponding to the reference antenna in the first CSI and a vector corresponding to the reference antenna in the second CSI.

As described above, the first signal and the second signal are signals that are sent by the terminal and that are transmitted to the AP in different time periods. Because sampling start times and front-end processing latencies are different when signals are received, phases of the received signals are also different. The reference antenna collects the first signal in the first time interval, and the vector corresponding to the reference antenna in the first CSI can reflect a phase formed when the first signal arrives at the reference antenna. The reference antenna further collects the second signal in the second time interval, and the vector corresponding to the reference antenna in the second CSI can reflect a phase formed when the second signal arrives at the reference antenna. Therefore, the phase difference vector between the first signal and the second signal can be determined using the vector corresponding to the reference antenna in the first CSI and the vector corresponding to the reference antenna in the second CSI.

For example, if the vector corresponding to the reference antenna in the first CSI is $CSI\_1(4)=[a_1 \cdot e^{j\alpha 1}, a_2 \cdot e^{j\alpha 2}, \ldots, a_k \cdot e^{j\alpha k}]$, a corresponding phase vector is $[\alpha 1, \alpha 2, \ldots, \alpha k]$; and if the vector corresponding to the reference antenna in the second CSI is $CSI\_2(5)=[b_1 \cdot e^{j\beta 1}, b_2 \cdot e^{j\beta 2}, \ldots, b_k \cdot e^{j\beta j}]$, a corresponding phase vector is $[\beta 1, \beta 2, \ldots, \beta k]$, where k is a sequence number of a frequency. In this case, a difference vector between the foregoing two phase vectors is used as the phase difference vector between the first signal and the second signal, i.e., $[\alpha 1-\beta 1, \alpha 2-\beta 2, \ldots, \alpha k-\beta k]$.

However, the signal may be interfered with by noise in a receiving and sending process and a path transmission process. To reduce impact of noise interference, in a possible implementation, after calculating the difference vector between the foregoing two vectors, the AP may fit a plurality of elements included in the difference vector, and determine a phase difference at each frequency location in the phase difference vector.

A frequency difference between adjacent frequencies is fixed, and phase differences at frequency locations are generally linear. Therefore, linear fitting may be performed on the elements in the difference vector, to obtain a linear offset function of the phase, and then the phase difference at each frequency location in the phase difference vector is determined based on the linear offset function. For example, fitting may be performed using a degree 1 polynomial y=px+q, and a coefficient of the degree 1 polynomial may be solved using an algorithm such as the least square method. This is not limited in this embodiment of this application. After the linear offset function y=px+q is determined, the phase difference at each frequency location is determined based on the function, to obtain the phase difference vector.

Step 206: The AP compensates for, using the phase difference vector, each of the M vectors in the second CSI that are corresponding to the M antennas in the second antenna group. Because a sequence of the first time interval and the second time interval may be reversed, compensating for the second CSI using the phase difference vector may be compensating for CSI corresponding to a signal that is collected first, or may be compensating for CSI corresponding to a signal that is collected last.

For example, if the phase difference vector determined in step 205 is $\theta=[\theta_1, \theta_2, \ldots, \theta_k]$, and the M vectors in the second CSI that are corresponding to the M antennas in the second antenna group are respectively $CSI\_2(1)=[c_1, c_2, \ldots, c_k]$, $CSI\_2(2)=[d_1, d_2, \ldots, d_k]$, ..., and $CSI\_2(M)=[e_1, e_2, \ldots, e_k]$, M compensated vectors may be $CSI'\_2(1)=[c_1 \cdot e^{j\theta_1}, c_2 \cdot e^{j\theta_2}, \ldots, c_k \cdot e^{j\theta_k}]$, $CSI'\_2(2)=[d_1 \cdot e^{j\theta_1}, d_2 \cdot e^{j\theta_2}, \ldots, d_k \cdot e^{j\theta_k}]$, ..., and $CSI'\_2(M)=[e_1 \cdot e^{j\theta_1}, e_2 \cdot e^{j\theta_2}, \ldots e_k \cdot e^{j\theta_k}]$.

Figure 3:
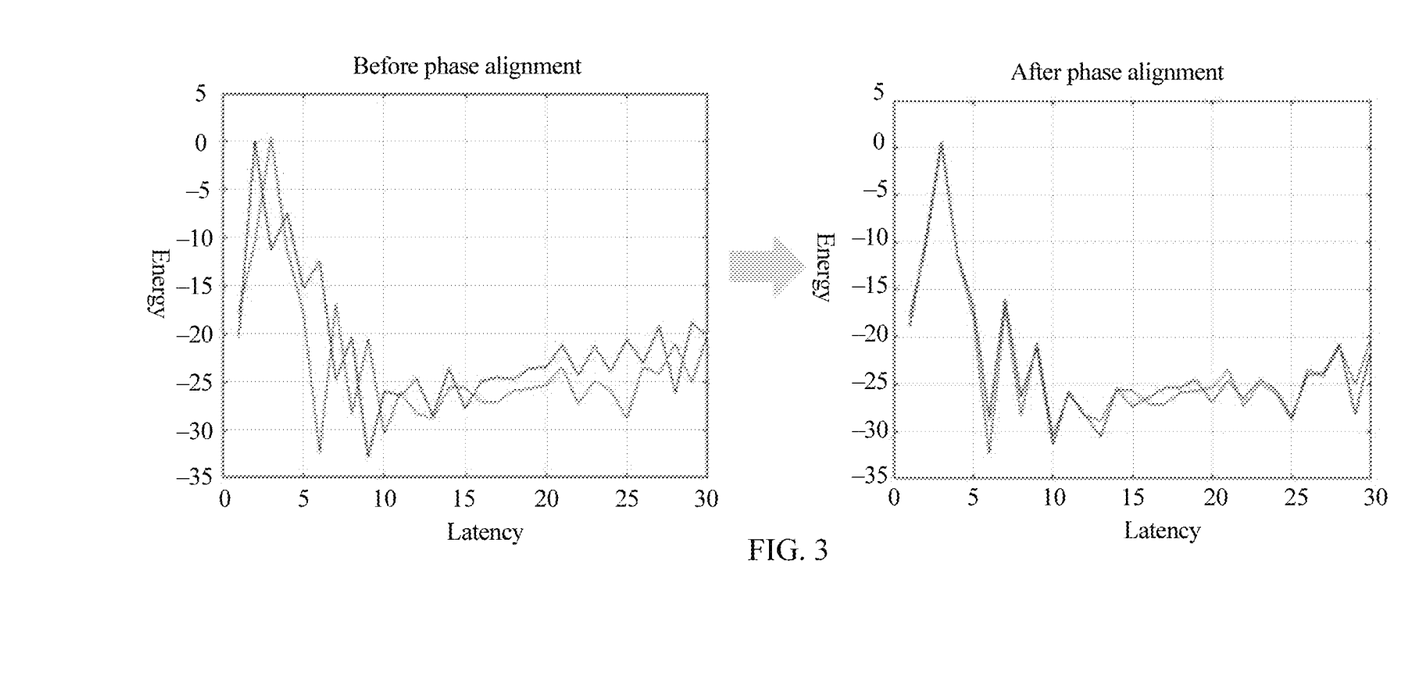
FIG. 3 is a schematic diagram of a vector before compensation and a compensated vector according to an embodiment of this application.

As shown in FIG. 3, before compensation, two fold lines are respectively drawn based on a vector corresponding to an antenna in the first antenna group and a vector corresponding to an antenna in the second antenna group. After the vectors corresponding to the antennas in the second antenna group are compensated for, fold lines that are drawn based on compensated vectors are shown in FIG. 3.

After the AP compensates for the M vectors in the second CSI, which is equivalent to obtaining CSI that is obtained based on signals received by the reference antenna, the first antenna group, and the second antenna group in the first time interval, the AP may further estimate, based on the first CSI and M compensated vectors in the second CSI, an angle of arrival of a signal sent by the terminal.

Step 207: The AP estimates, based on the first CSI and M compensated vectors in the second CSI, an angle of arrival of a signal sent by the terminal.

Figure 4:
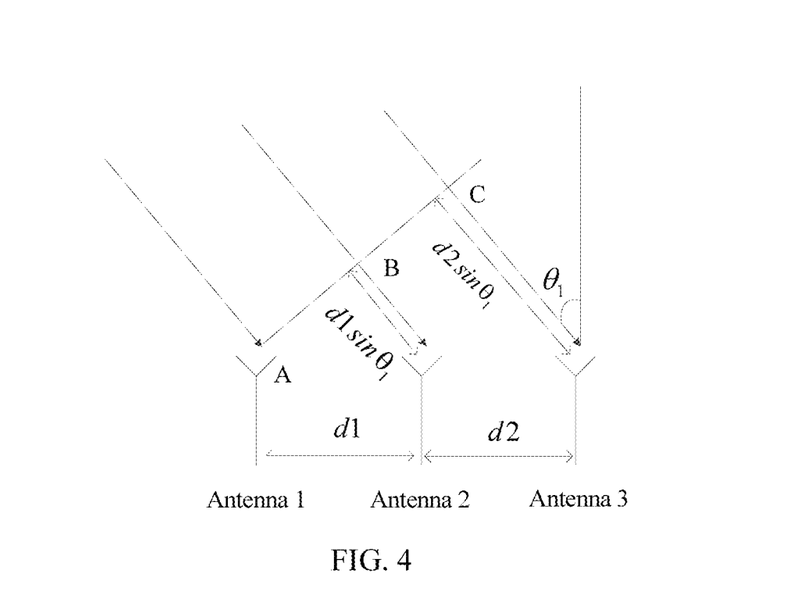
FIG. 4 is a schematic diagram showing that an angle of arrival is estimated using a linear array antenna according to an embodiment of this application.

A linear array antenna is used as an example. As shown in FIG. 4, it may be considered that incoming wave directions of signals received by antennas are parallel to each other, and therefore it may be considered that phases formed when signals are transmitted to a point A (that is, a location of an antenna 1), a point B, and a point C are the same. CSI corresponding to each antenna can reflect a phase of a signal received by the antenna, to be more specific, a phase of a signal when the signal is transmitted to a location of an antenna 2 and a phase of a signal when the signal is transmitted to a location of an antenna 3 are known. In addition, a distance d1 between the antenna 1 and the antenna 2 and a distance d2 between the antenna 2 and the antenna 3 are also known. Therefore, the AP may estimate an angle of arrival $\varphi_1$ based on a wavelength of the signal. Further, if the first antenna group and the second antenna group form a two-dimensional antenna array, the angle of arrival estimated by the AP may include angles of different planes, in other words, a direction of the signal in three-dimensional space may be obtained.

As described above, in step 206, the N vectors in the first CSI that are corresponding to the N antennas in the first antenna group may also be compensated for using the phase difference vector. Correspondingly, in step 207, the AP estimates, based on the second CSI and N compensated vectors in the first CSI, the angle of arrival of the signal sent by the terminal.

In a possible implementation, after estimating the angle of arrival of the signal sent by the terminal, the AP may send the estimated angle of arrival to a server. The server locates the terminal based on angles of arrival estimated by at least two APs.

In another possible implementation, the AP may locate the terminal. The AP may receive a first message sent by the terminal, and send a second message to the terminal after receiving the first message, to respond to the first message. Then, the AP may receive a third message sent by the terminal. The first message or the third message includes a time at which the terminal sends the first message, and the third message includes a time at which the terminal receives the second message. The AP may estimate a distance between the AP and the terminal based on the time at which the terminal sends the first message, a time at which the AP receives the first message, a time at which the AP sends the second message, and the time at which the terminal receives the second message.

Figure 5:
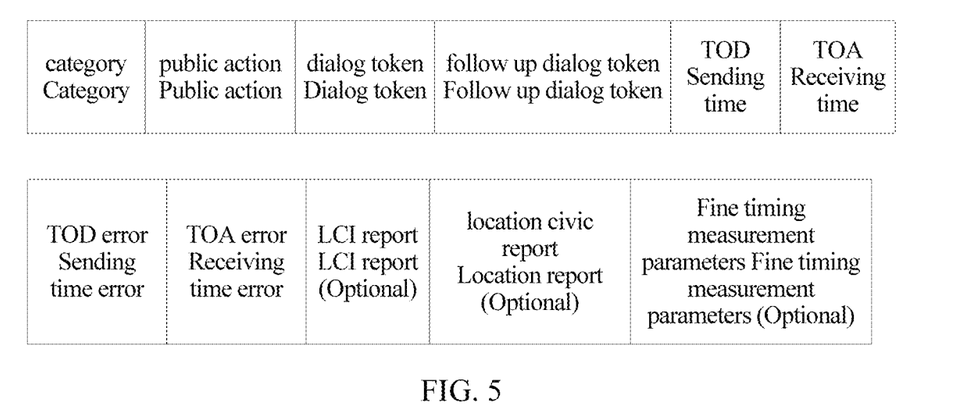
FIG. 5 is a schematic diagram of a frame structure of a second message according to an embodiment of this application.

For example, as shown in FIG. 5, a frame structure of the third message sent by the terminal may include a category (category) field, a public action field, a dialog token field, a follow-up dialog token field, a sending time such as a time of delivery (TOD) field, a receiving time such as a time of arrival (TOA) field, a sending time error (TOD error) field, a receiving time error (TOA error) field, and the like. The time at which the terminal sends the first message and the time at which the terminal receives the second message may be respectively added to the TOD field and the TOA field, and sent to the AP.

Figure 6:
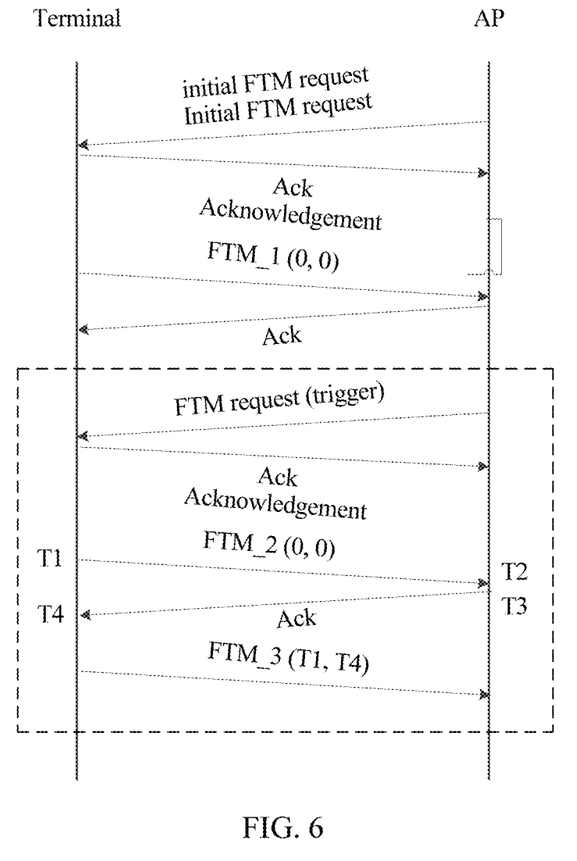
FIG. 6 is a schematic diagram of a ranging procedure according to an embodiment of this application.

For example, as shown in FIG. 6, the terminal sends the first message (FTM_2 (0, 0) in FIG. 6) to the AP at a moment T1, the AP receives the first message at a moment T2, and sends the second message (Ack in FIG. 6) to the terminal at a moment T3, and the terminal receives the second message at a moment T4. The terminal then sends the third message (FTM_3 in FIG. 6) to the AP, and the message includes indication information of the moment T1 and the moment T4. It can be learned that a total transmission time of the first message and the second message is (T4−T1)−(T3−T2), and the distance between the AP and the terminal is v×[(T4−T1)−(T3−T2)]/2, where v represents a signal propagation speed. According to the foregoing algorithm, even if time of the AP is inconsistent with time of the terminal, calculation of the transmission time is not affected. Certainly, if the time of the AP is consistent with the time of the terminal, the distance between the AP and the terminal may be estimated based on a transmission time T2−T1 of the first message or a transmission time T4−T3 of the second message.

For example, the foregoing process may be triggered by the AP. For example, the AP may send, to the terminal, indication information (for example, a fine timing measurement (FTM) request shown in FIG. 6) used to trigger a ranging procedure, and the terminal replies with response information (ack), to indicate whether the terminal permits initiation of the ranging procedure. If the terminal permits initiation of the ranging procedure, the terminal sends the first message to the AP.

When the AP locates the terminal, the AP may alternatively locate the terminal based on a height of the AP, an estimated angle of arrival (which, as described above, may include an angle in a horizontal direction and an angle in a vertical direction), and an empirical value of a height at which a user holds the terminal.

Figure 7:
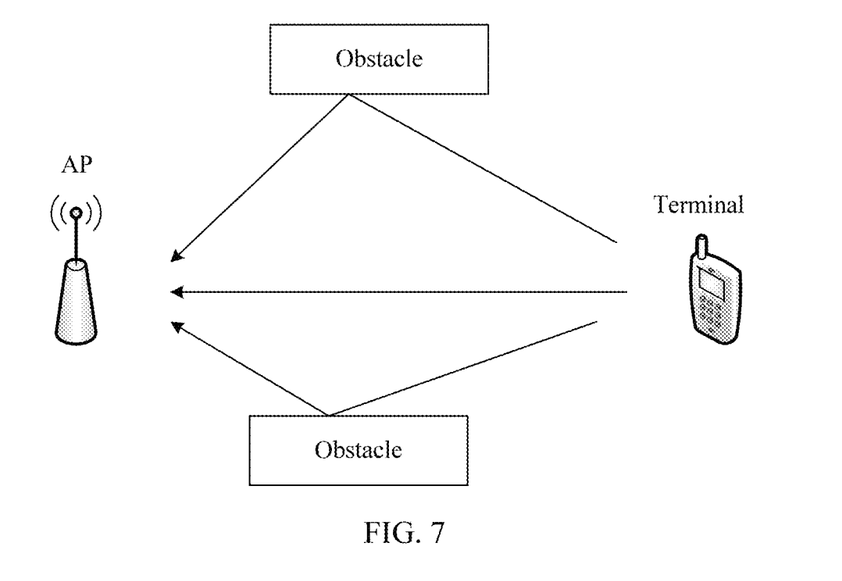
FIG. 7 is a schematic diagram of multipath transmission according to an embodiment of this application.

In addition, as shown in FIG. 7, signals sent by the terminal may arrive at the AP through a plurality of transmission paths. Therefore, a signal received by the AP is superimposition of a plurality of signals that successively arrive at the AP through the plurality of paths. An angle of arrival of a signal on a line of sight (line of sight, LOS) path is an angle of arrival that needs to be used to locate the terminal. Therefore, the AP may further determine the signal on the LOS path in a plurality of signals that are from a same terminal and that arrive at the AP through different paths.

In a possible implementation, the AP may perform a related operation on the received signal using a frequency domain sequence on a known legacy long training field (L-LTF). Because a legacy long training field in a packet is characterized by good autocorrelation, a plurality of pulse signals are obtained after the related operation. Usually, the signal on the LOS path arrives at the AP first. Therefore, the AP may use, as the signal on the LOS path, a signal corresponding to a pulse signal that arrives at the AP first, and estimate an angle of arrival of the signal on the LOS path by using the foregoing angle of arrival estimation method, to locate the terminal.

Figure 8:
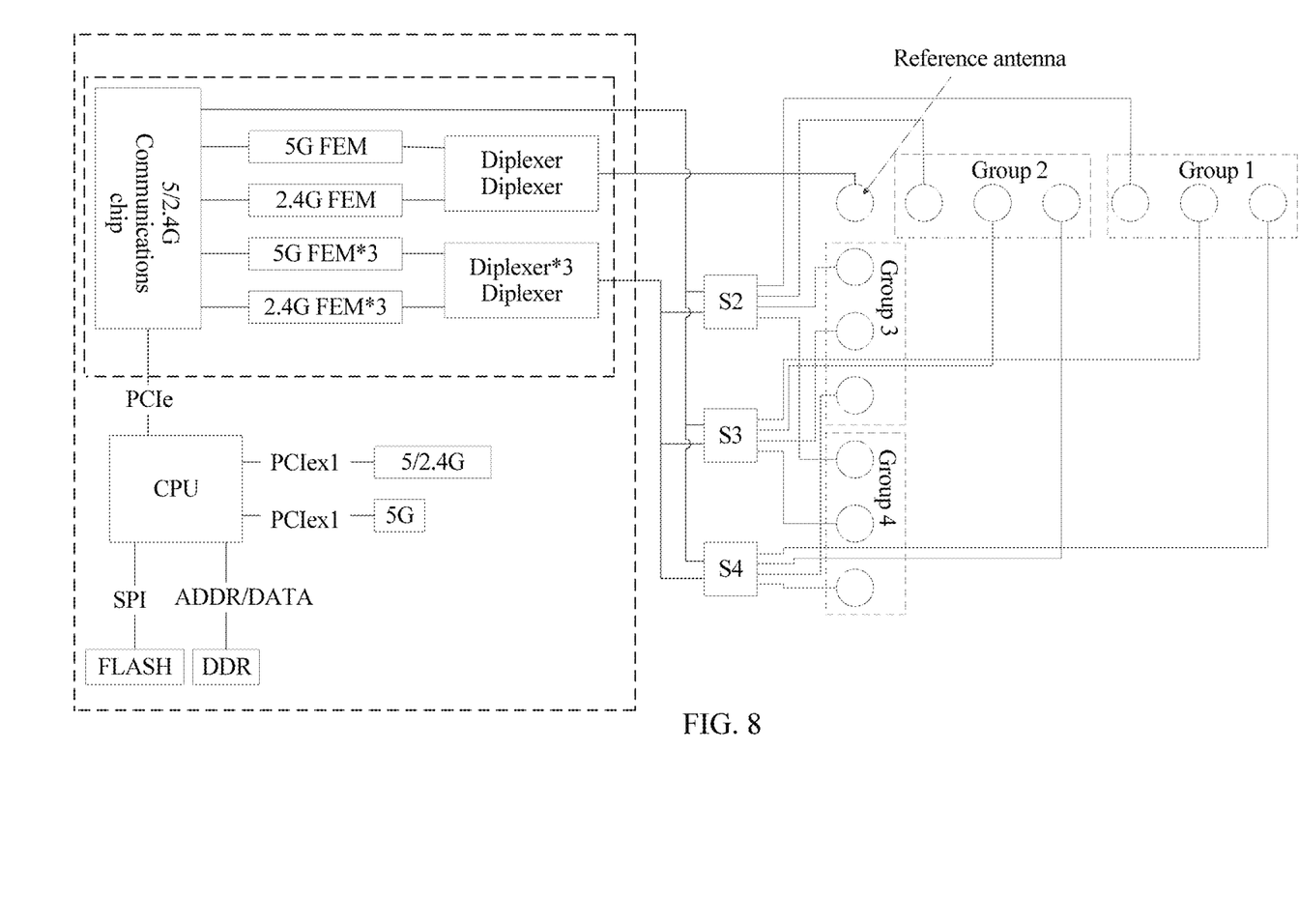
FIG. 8 is a second schematic structural diagram of an AP according to an embodiment of this application.

The foregoing embodiment of this application is described by using an example in which the AP includes the reference antenna and two antenna groups. It should be understood that the AP may alternatively include more antenna groups. For example, as shown in FIG. 8, an AP structure may further include a communications chip that works at 5 GHz or 2.4 GHz, a central processing unit (CPU), a flash memory, a double rate (DDR) memory, a radio frequency front-end module that works at 5 GHz, a radio frequency front-end module that works at 2.4 GHz, a diplexer, a changeover switch S2, a changeover switch S3, a changeover switch S4, a reference antenna, an antenna group 1, an antenna group 2, an antenna group 3, and an antenna group 4. The reference antenna is connected to one radio frequency front-end module. Three antennas in the antenna group 1 are respectively connected to a channel 1 of the changeover switch S2, a channel 1 of the changeover switch S3, and a channel 1 of the changeover switch S4. Three antennas in the antenna group 2 are respectively connected to a channel 2 of the changeover switch S2, a channel 2 of the changeover switch S3, and a channel 2 of the changeover switch S4. Three antennas in the antenna group 3 are respectively connected to a channel 3 of the changeover switch S2, a channel 3 of the changeover switch S3, and a channel 3 of the changeover switch S4. Three antennas in the antenna group 4 are respectively connected to a channel 4 of the changeover switch S2, a channel 4 of the changeover switch S3, and a channel 4 of the changeover switch S4. Each of the changeover switch S2, the changeover switch S3, and the changeover switch S4 connects, at a same moment, one of four antennas connected to each of the changeover switch S2, the changeover switch S3, and the changeover switch S4 to one radio frequency front-end module, to collect a signal. It should be understood that the AP structure shown in FIG. 8 is an example embodiment obtained after detailing the AP structure shown in FIG. 1. In actual application, the AP may include more or fewer elements than those shown in FIG. 8.

The changeover switches are disposed, such that signals received by the reference antenna and the three antennas in the antenna group 1 are collected in a time interval 1, and CSI_1 is obtained based on the received signals; signals received by the reference antenna and the three antennas in the antenna group 2 are collected in a time interval 2, and CSI_2 is obtained based on the received signals; signals received by the reference antenna and the three antennas in the antenna group 3 are collected in a time interval 3, and CSI_3 is obtained based on the received signals; and signals received by the reference antenna and the three antennas in the antenna group 4 are collected in a time interval 4, and CSI_4 is obtained based on the received signals. Then, the AP determines, based on vectors corresponding to the reference antenna in CSI_1 and CSI_2, a phase difference vector between the signal collected by the reference antenna in the time interval 1 and the signal collected by the reference antenna in the time interval 2, and compensates for, using the phase difference vector, vectors in CSI_2 that are corresponding to the antennas in the antenna group 2; determines, based on vectors corresponding to the reference antenna in CSI_1 and CSI_3, a phase difference vector between the signal collected by the reference antenna in the time interval 1 and the signal collected by the reference antenna in the time interval 3, and compensates for, using the phase difference vector, vectors in CSI_3 that are corresponding to the antennas in the antenna group 3; and determines, based on vectors corresponding to the reference antenna in CSI_1 and CSI_4, a phase difference vector between the signal collected by the reference antenna in the time interval 1 and the signal collected by the reference antenna in the time interval 4, and compensates for, using the phase difference vector, vectors in CSI_4 that are corresponding to the antennas in the antenna group 4. Finally, the angle of arrival of the signal sent by the terminal is estimated based on CSI_1 and the foregoing compensated vectors.

Each changeover switch may control switching of a connected antenna through general purpose input/output (GPIO) in the chip. In consideration of a moving speed of the terminal, usually, a signal of each antenna is collected every 250 milliseconds (ms), such that a general positioning accuracy requirement on a terminal can be met. Therefore, for the foregoing AP that includes the four antenna groups, the changeover switch may be switched every 80 ms. Certainly, the foregoing values are only examples. In actual application, different switching periods may be set based on different scenarios and different accuracy requirements. This is not limited in this embodiment of this application.

The foregoing angle of arrival estimation method may be applied to a device in which a quantity of antennas is greater than a quantity of radio frequency circuits, and a changeover switch may be added to a hardware circuit, such that the radio frequency circuit collects, in different time periods, signals received by different antennas. In the foregoing method, the first device determines the phase difference vector between the first signal and the second signal based on the vector corresponding to the reference antenna in the first CSI and the vector corresponding to the reference antenna in the second CSI, and the phase difference is generated due to a difference between receiving times of signals sent by the second device. The first device compensates for, based on the phase difference vector, a vector other than the vector corresponding to the reference antenna in the second CSI (or the first CSI), which is equivalent to obtaining CSI that is obtained based on signals received by the reference antenna, the first antenna group, and the second antenna group in a same time period, and then estimating, based on the CSI, the angle of arrival of the signal sent by the second device. Because the angle of arrival of the second device is estimated using the signals received by the reference antenna, the first antenna group, and the second antenna group, estimation accuracy of the angle of arrival is improved, and the quantity of radio frequency circuits does not need to be increased.

Figure 9:
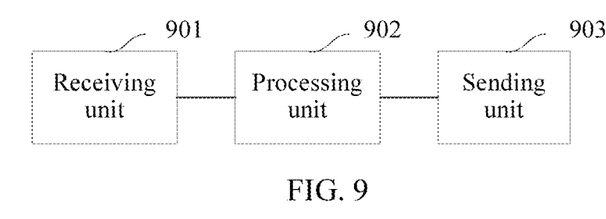
FIG. 9 is a first schematic structural diagram of an angle of arrival estimation device according to an embodiment of this application.

Based on a same technical concept, an embodiment of this application further provides an angle of arrival estimation device, configured to implement the foregoing method embodiment. The device may be implemented by a wireless device. As shown in FIG. 9, the device may include a receiving unit 901 and a processing unit 902, and may further include a sending unit 903.

The receiving unit 901 is configured to: collect, in a first time interval, a first signal from a second device using a reference antenna of the wireless device and each antenna in a first antenna group of the wireless device, where the first antenna group includes N antennas, and N is an integer greater than or equal to 1; and collect, in a second time interval, a second signal from the second device using the reference antenna and each antenna in a second antenna group of the wireless device, where the second antenna group includes M antennas, and M is an integer greater than or equal to 1.

The processing unit 902 is configured to: estimate first channel state information CSI, where the first CSI is CSI of the first signal, the first CSI includes N+1 vectors, and the N+1 vectors respectively correspond to the N antennas and the reference antenna; estimate second CSI, where the second CSI is CSI of the second signal, the second CSI includes M+1 vectors, and the M+1 vectors respectively correspond to the M antennas and the reference antenna; determine a phase difference vector between the first signal and the second signal based on a vector corresponding to the reference antenna in the first CSI and a vector corresponding to the reference antenna in the second CSI; and compensate for each of the M vectors corresponding to the M antennas in the second CSI using the phase difference vector, and estimate, based on the first CSI and M compensated vectors in the second CSI, an angle of arrival of a signal sent by the second device, or compensate for each of the N vectors corresponding to the N antennas in the first CSI using the phase difference vector, and estimate, based on the second CSI and N compensated vectors in the first CSI, an angle of arrival of a signal sent by the second device.

In a possible implementation, when determining the phase difference vector between the first signal and the second signal that are collected by the reference antenna, the processing unit 902 is configured to: calculate a difference between the vector corresponding to the reference antenna in the first CSI and the vector corresponding to the reference antenna in the second CSI, fit a plurality of elements in the difference based on frequencies corresponding to the plurality of elements in the difference, and determine a phase difference at each frequency location in the phase difference vector.

In a possible implementation, the receiving unit 901 is further configured to receive a first message sent by the second device.

The device further includes the sending unit 903, configured to send a second message to the second device, where the second message is a response to the first message.

The receiving unit 901 is further configured to receive a third message sent by the second device. The first message or the third message includes a time at which the second device sends the first message, and the third message includes a time at which the second device receives the second message.

The processing unit 902 is further configured to: estimate a distance between the device and the second device based on the time at which the second device sends the first message, a time at which the device receives the first message, a time at which the device sends the second message, and the time at which the second device receives the second message; and locate the second device based on the distance and the angle of arrival.

It should be noted that division of the foregoing units is merely division of logical functions. For example, the receiving unit and the sending unit may be separately disposed, or may form a transceiver unit. In addition, the transceiver unit may be integrated into the processing unit or may be implemented separately. These units may all be implemented in a form of software invoked using a processing element, or may all be implemented in a form of hardware; or some units may be implemented in a form of software invoked using a processing element, and some units may be implemented in a form of hardware. The processing element herein may be an integrated circuit having a signal processing capability. In an implementation process, steps in the foregoing method or the foregoing units may be implemented using a hardware integrated logic circuit in the processing element, or by using instructions in a form of software.

These units may be one or more integrated circuits configured to implement the foregoing method, for example, one or more application-specific integrated circuits (ASIC), one or more microprocessors, or one or more field programmable gate arrays (FPGA). For another example, when a unit is implemented in a form of a program invoked using a processing element, the processing element may be a general purpose processor, for example, a central processing unit (CPU) or another processor that can invoke the program. For another example, these units may be integrated together and implemented in a form of a system-on-a-chip (SOC).

Figure 10:
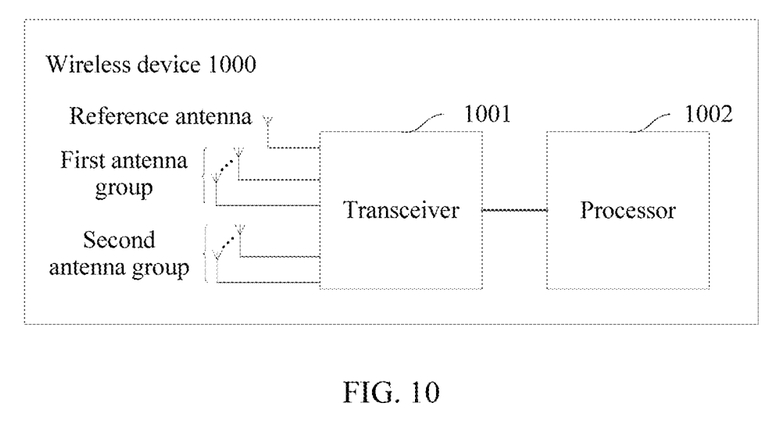
FIG. 10 is a second schematic structural diagram of an angle of arrival estimation device according to an embodiment of this application.

Based on a same technical concept, an embodiment of this application further provides a wireless device, configured to implement the foregoing method embodiment. As shown in FIG. 10, a wireless device 1000 may include a transceiver 1001 and a processor 1002. The transceiver 1001 includes a reference antenna, a first antenna group, and a second antenna group, the first antenna group includes N antennas, N is an integer greater than or equal to 1, the second antenna group includes M antennas, and M is an integer greater than or equal to 1.

The transceiver 1001 is configured to: collect, in a first time interval, a first signal from a second device using the reference antenna and each antenna in the first antenna group; and collect, in a second time interval, a second signal from the second device using the reference antenna and each antenna in the second antenna group.

The processor 1002 is configured to: estimate first channel state information CSI, where the first CSI is CSI of the first signal, the first CSI includes N+1 vectors, and the N+1 vectors respectively correspond to the N antennas and the reference antenna; estimate second CSI, where the second CSI is CSI of the second signal, the second CSI includes M+1 vectors, and the M+1 vectors respectively correspond to the M antennas and the reference antenna; determine a phase difference vector between the first signal and the second signal based on a vector corresponding to the reference antenna in the first CSI and a vector corresponding to the reference antenna in the second CSI; and compensate for each of the M vectors corresponding to the M antennas in the second CSI using the phase difference vector, and estimate, based on the first CSI and M compensated vectors in the second CSI, an angle of arrival of a signal sent by the second device, or compensate for each of the N vectors corresponding to the N antennas in the first CSI using the phase difference vector, and estimate, based on the second CSI and N compensated vectors in the first CSI, an angle of arrival of a signal sent by the second device.

In a possible implementation, when determining the phase difference vector between the first signal and the second signal that are collected by the reference antenna, the processor 1002 is configured to: calculate a difference between the vector corresponding to the reference antenna in the first CSI and the vector corresponding to the reference antenna in the second CSI, fit a plurality of elements in the difference based on frequencies corresponding to the plurality of elements in the difference, and determine a phase difference at each frequency location in the phase difference vector.

In a possible implementation, the transceiver 1001 is further configured to: receive a first message sent by the second device, and send a second message to the second device, where the second message is a response to the first message; and receive a third message sent by the second device, where the first message or the third message includes a time at which the second device sends the first message, and the third message includes a time at which the second device receives the second message.

The processor 1002 is further configured to: estimate a distance between the wireless device and the second device based on the time at which the second device sends the first message, a time at which the wireless device receives the first message, a time at which the wireless device sends the second message, and the time at which the second device receives the second message; and locate the second device based on the distance and the angle of arrival.

The processor 1002 may be a general purpose CPU, a microprocessor, an ASIC, or one or more integrated circuits configured to control program execution in the solutions of this application.

In some implementations, in an embodiment, the processor 1002 may include one or more CPUs.

In some implementations, in an embodiment, the device may include a plurality of processors. Each of these processors may be a single-core processor, or may be a multi-core processor. The processor herein may be one or more devices, a circuit, and/or a processing core used for processing data (such as a computer program instruction).

Based on a same technical concept, this application provides a computer readable storage medium. The computer readable storage medium stores a computer instruction, and when the instruction runs on a computer, the computer performs the angle of arrival estimation method in the foregoing method embodiment.

A person skilled in the art should understand that the embodiments of this application may be provided as a method, a system, or a computer program product. Therefore, this application may use a form of hardware only embodiments, software only embodiments, or embodiments with a combination of software and hardware. Moreover, the present disclosure may use a form of a computer program product that is implemented on one or more computer-readable storage media (including but not limited to a disk memory, an optical memory, and the like) that include a computer instruction.

The objectives, technical methods, and beneficial effects of this application have been described in detail in the foregoing embodiments. It should be understood that the foregoing description is merely example implementations of this application, but are not intended to limit the protection scope of this application. Any modifications and variations made on the basis of the technical solutions of this application shall fall within the protection scope of this application.

What is claimed is:

1. An angle of arrival estimation method, the method comprising:
   collecting, by a first device in a first time interval, a first signal from a second device using a reference antenna of the first device and each antenna in a first antenna group of the first device, wherein the first antenna group comprises N antennas, and wherein N is an integer greater than or equal to 1;
   collecting, by the first device in a second time interval, a second signal from the second device using the reference antenna and each antenna in a second antenna group of the first device, wherein the second antenna group comprises M antennas, and wherein M is an integer greater than or equal to 1;
   estimating, by the first device, first channel state information (CSI) of the first signal, wherein the first CSI comprises N vectors corresponding to the N antennas and a first vector corresponding to the reference antenna;
   estimating, by the first device, second CSI of the second signal, wherein the second CSI comprises M vectors corresponding to the M antennas and a second vector corresponding to the reference antenna;
   determining, by the first device, a phase difference vector between the first signal and the second signal based on the first vector corresponding to the reference antenna in the first CSI and the second vector corresponding to the reference antenna in the second CSI;
   compensating for, by the first device, each of the M vectors corresponding to the M antennas in the second CSI using the phase difference vector; and
   estimating, based on the first CSI and M compensated vectors in the second CSI, an angle of arrival of a signal from the second device.

2. The method according to claim 1, wherein determining the phase difference vector between the first signal and the second signal comprises calculating, by the first device, a difference between the first vector corresponding to the reference antenna in the first CSI and the second vector corresponding to the reference antenna in the second CSI, wherein N is an integer greater than or equal to 2, and wherein M is an integer greater than or equal to 2.

3. The method according to claim 1, further comprising:
   receiving, by the first device, a first message from the second device;
   sending a second message to the second device, wherein the second message is a response to the first message; and
   receiving, by the first device, a third message from the second device, wherein the first message or the third message comprises a time at which the second device sends the first message, and wherein the third message comprises a time at which the second device receives the second message.

4. The method according to claim 1, further comprising:
   receiving, by the first device, a first message from the second device;
   sending a second message to the second device, wherein the second message is a response to the first message;
   receiving, by the first device, a third message from the second device, wherein the first message or the third message comprises a time at which the second device sends the first message, and wherein the third message comprises a time at which the second device receives the second message;
   estimating, by the first device, a distance between the first device and the second device based on the time at which the second device sends the first message, a time at which the first device receives the first message, a time at which the first device sends the second message, and the time at which the second device receives the second message; and
   locating, by the first device, the second device based on the distance and the angle of arrival.

5. A wireless device, comprising:
   a transceiver comprising a reference antenna, a first antenna group, and a second antenna group, wherein the first antenna group comprises N antennas, wherein N is an integer greater than or equal to 1, wherein the second antenna group comprises M antennas, and wherein M is an integer greater than or equal to 1, wherein the transceiver is configured to:
   collect, in a first time interval, a first signal from another wireless device using the reference antenna and each antenna in the first antenna group; and
   collect, in a second time interval, a second signal from the other wireless device using the reference antenna and each antenna in the second antenna group; and a processor coupled to the transceiver and configured to:
estimate first channel state information (CSI) of the first signal, wherein the first CSI comprises N+1 vectors respectively corresponding to the N antennas and the reference antenna;
estimate second CSI of the second signal, wherein the second CSI comprises M+1 vectors respectively corresponding to the M antennas and the reference antenna;
determine a phase difference vector between the first signal and the second signal based on a vector corresponding to the reference antenna in the first CSI and a vector corresponding to the reference antenna in the second CSI;
compensate for each of the M vectors corresponding to the M antennas in the second CSI using the phase difference vector; and
estimate, based on the first CSI and M compensated vectors in the second CSI, an angle of arrival of a signal from the other wireless device.

6. The wireless device according to claim 5, wherein when determining the phase difference vector between the first signal and the second signal that are collected by the reference antenna, the processor is configured to calculate a difference between the vector corresponding to the reference antenna in the first CSI and the vector corresponding to the reference antenna in the second CSI.

7. The wireless device according to claim 5, wherein the transceiver is further configured to:
receive a first message from the other wireless device;
send a second message to the other wireless device, wherein the second message is a response to the first message; and
receive a third message from the other wireless device, wherein the first message or the third message comprises a time at which the wireless device sends the first message, and wherein the third message comprises a time at which the wireless device receives the second message.

8. The wireless device according to claim 6, wherein the transceiver is further configured to:
receive a first message from the other wireless device;
send a second message to the other wireless device, wherein the second message is a response to the first message; and
receive a third message from the other wireless device, wherein the first message or the third message comprises a time at which the wireless device sends the first message, and the third message comprises a time at which the wireless device receives the second message, and
wherein the processor is further configured to:
estimate a distance between the device and the other wireless device based on the time at which the other wireless device sends the first message, a time at which the transceiver receives the first message, a time at which the transceiver sends the second message, and the time at which the other wireless device receives the second message; and
locate the other wireless device based on the distance and the angle of arrival.

9. The wireless device according to claim 6, wherein when determining the phase difference vector between the first signal and the second signal that are collected by the reference antenna, the processor is further configured to fit a plurality of elements in the difference based on frequencies corresponding to the plurality of elements in the difference, and determine a phase difference at each frequency location in the phase difference vector.

10. The wireless device according to claim 7, wherein the processor is further configured to:
estimate a distance between the device and the other wireless device based on the time at which the other wireless device sends the first message, a time at which the transceiver receives the first message, a time at which the transceiver sends the second message, and the time at which the other wireless device receives the second message; and
locate the other wireless device based on the distance and the angle of arrival.

11. The method according to claim 2, wherein determining the phase difference vector between the first signal and the second signal further comprises:
fitting, by the first device, a plurality of elements in the difference based on frequencies corresponding to the plurality of elements in the difference; and
determining a phase difference at each frequency location in the phase difference vector.

12. The method according to claim 11, wherein determining the phase difference vector between the first signal and the second signal further comprises determining a phase difference at each frequency location in the phase difference vector.

13. The method according to claim 3, further comprising estimating, by the first device, a distance between the first device and the second device based on the time at which the second device sends the first message, a time at which the first device receives the first message, a time at which the first device sends the second message, and the time at which the second device receives the second message.

14. The method according to claim 13, further comprising locating, by the first device, the second device based on the distance and the angle of arrival.

15. A non-transitory computer medium storing instructions executable by a first processor of a first device such that when executed, cause the first device to implement an angle of arrival estimation method, the method comprising:
collecting, by the first device in a first time interval, a first signal from a second device using a reference antenna of the first device and each antenna in a first antenna group of the first device, wherein the first antenna group comprises N antennas, and wherein N is an integer greater than or equal to 1;
collecting, by the first device in a second time interval, a second signal from the second device using the reference antenna and each antenna in a second antenna group of the first device, wherein the second antenna group comprises M antennas, and wherein M is an integer greater than or equal to 1;
estimating, by the first device, first channel state information (CSI) of the first signal, wherein the first CSI comprises N vectors corresponding to the N antennas and a first vector corresponding to the reference antenna;
estimating, by the first device, second CSI of the second signal, wherein the second CSI comprises M vectors corresponding to the M antennas and a second vector corresponding to the reference antenna;
determining, by the first device, a phase difference vector between the first signal and the second signal based on the first vector corresponding to the reference antenna in the first CSI and the second vector corresponding to the reference antenna in the second CSI;

compensating, by the first device, for each of the M vectors corresponding to the M antennas in the second CSI using the phase difference vector; and estimating, by the first device based on the first CSI and M compensated vectors in the second CSI, an angle of arrival of a signal from the second device.

16. The non-transitory computer medium according to claim 15, wherein determining the phase difference vector between the first signal and the second signal comprises calculating a difference between the vector corresponding to the reference antenna in the first CSI and the vector corresponding to the reference antenna in the second CSI.

17. The non-transitory computer medium according to claim 16, wherein determining the phase difference vector between the first signal and the second signal further comprises fitting a plurality of elements in the difference based on frequencies corresponding to the plurality of elements in the difference.

18. The non-transitory computer medium according to claim 17, wherein determining the phase difference vector between the first signal and the second signal further comprises determining a phase difference at each frequency location in the phase difference vector.

19. The non-transitory computer medium according to claim 15, wherein the method further comprises:
receiving a first message from the second device;
sending a second message to the second device, wherein the second message is a response to the first message; and
receiving a third message from the second device, wherein the first message or the third message comprises a time at which the second device sends the first message, and wherein the third message comprises a time at which the second device receives the second message.

20. The non-transitory computer medium according to claim 19, wherein the method further comprises:
estimating a distance between the first device and the second device based on the time at which the second device sends the first message, a time at which the first device receives the first message, a time at which the first device sends the second message, and the time at which the second device receives the second message; and
locating the second device based on the distance and the angle of arrival.

* * * * *